United States Patent
Keller

(10) Patent No.: US 11,161,327 B2
(45) Date of Patent: Nov. 2, 2021

(54) PENETRATION RESISTANT LAMINATED GLASS MANUFACTURED WITH INTERLAYER FILM LAYERS HAVING REDUCED ADHESION AND LOW PLASTICIZER CONTENT

(71) Applicant: KURARAY EUROPE GMBH, Hattersheim (DE)

(72) Inventor: Uwe Keller, Hattersheim (DE)

(73) Assignee: KURARAY EUROPE GMBH, Hattersheim (DE)

( * ) Notice: Subject to any disclaimer, the term of this patent is extended or adjusted under 35 U.S.C. 154(b) by 645 days.

(21) Appl. No.: 15/092,808

(22) Filed: Apr. 7, 2016

(65) Prior Publication Data

US 2016/0339676 A1 Nov. 24, 2016

(30) Foreign Application Priority Data

May 22, 2015 (EP) .................................... 15168791

(51) Int. Cl.
| | | |
|---|---|---|
| B32B 17/10 | (2006.01) | |
| B32B 27/08 | (2006.01) | |
| B32B 27/30 | (2006.01) | |
| B32B 37/14 | (2006.01) | |

(52) U.S. Cl.
CPC .. *B32B 17/10761* (2013.01); *B32B 17/10036* (2013.01); *B32B 17/10596* (2013.01); *B32B 17/10605* (2013.01); *B32B 17/10633* (2013.01); *B32B 17/10688* (2013.01); *B32B 27/08* (2013.01); *B32B 27/306* (2013.01); *B32B 37/14* (2013.01); *B32B 2307/202* (2013.01); *B32B 2307/56* (2013.01)

(58) Field of Classification Search
CPC ..... B32B 17/00–17/1099; B32B 27/08; B32B 27/306
See application file for complete search history.

(56) References Cited

U.S. PATENT DOCUMENTS

| | | | | |
|---|---|---|---|---|
| 3,262,837 | A * | 7/1966 | Mont ................ | B32B 17/10688 156/106 |
| 5,547,736 | A * | 8/1996 | Simon ...................... | B32B 3/10 428/143 |
| 7,312,275 | B2 | 12/2007 | Papenfuhs et al. | |
| 7,358,304 | B2 | 4/2008 | Papenfuhs et al. | |
| 7,462,664 | B2 * | 12/2008 | Smith ............... | B32B 17/10688 524/400 |
| 7,511,096 | B2 | 3/2009 | Papenfuhs et al. | |
| 7,528,192 | B2 | 5/2009 | Papenfuhs et al. | |
| 7,883,761 | B2 * | 2/2011 | Bourcier .......... | B32B 17/10587 428/141 |
| 8,574,706 | B2 * | 11/2013 | Lu .......................... | B32B 17/10 296/84.1 |
| 2005/0118445 | A1 | 6/2005 | Wong et al. | |
| 2006/0228529 | A1 * | 10/2006 | Liposcak ................. | B32B 3/18 428/189 |
| 2007/0148472 | A1 * | 6/2007 | Masaki ............. | B32B 17/10036 428/426 |
| 2008/0102280 | A1 * | 5/2008 | Lu ..................... | B32B 17/10339 428/411.1 |
| 2013/0075949 | A1 * | 3/2013 | Chen ....................... | C08L 29/14 264/176.1 |
| 2014/0110039 | A1 | 4/2014 | Lellig et al. | |
| 2014/0224423 | A1 | 8/2014 | Keller | |
| 2014/0363651 | A1 * | 12/2014 | Lu ........................... | B32B 7/02 428/217 |

FOREIGN PATENT DOCUMENTS

| | | | | |
|---|---|---|---|---|
| DE | 19756274 A1 | 6/1999 | | |
| EP | 1 527 107 A1 | 5/2005 | | |
| EP | 1 606 325 B1 | 12/2006 | | |
| EP | 2489508 A1 * | 8/2012 | ............. | B32B 17/10 |
| JP | 2007070200 A * | 3/2007 | ....... | B32B 17/10688 |
| WO | 03/020776 A1 | 3/2003 | | |
| WO | 2004/063231 A1 | 7/2004 | | |
| WO | 2015/078989 A | 6/2015 | | |
| WO | 2015078993 A1 | 6/2015 | | |

OTHER PUBLICATIONS

Machine translation of JP2007-070200. Retrieved Jul. 22, 2018.*

* cited by examiner

*Primary Examiner* — Prashant J Khatri

(74) *Attorney, Agent, or Firm* — Brooks Kushman P.C.

(57) ABSTRACT

Penetration resistant laminated glass is obtained by laminating at least one film A containing a polyvinyl acetal PA and optionally at least one plasticiser WA and at least one film B containing a polyvinyl acetal PB and at least one plasticiser WB between two glass sheets, where prior to lamination, the amount of plasticiser WA in film A is less than 16% by weight, the amount of plasticiser WB in film B is at least 16% by weight, and film A comprises at least 7 ppm alkali ions.

18 Claims, No Drawings

PENETRATION RESISTANT LAMINATED GLASS MANUFACTURED WITH INTERLAYER FILM LAYERS HAVING REDUCED ADHESION AND LOW PLASTICIZER CONTENT

CROSS-REFERENCE TO RELATED APPLICATIONS

This application claims priority to European Patent Application No 15168791.0 filed May 22, 2015, the disclosure of which is incorporated in its entirety by reference herein.

BACKGROUND OF THE INVENTION

1. Field of the Invention

The present invention relates to laminated glass comprising two glass sheets combined by an adhesive interlayer film which is manufactured with at least one layer based on polyvinyl acetal having low plasticizer content and an adhesion control agent to provide good penetration resistance.

2. Background Art

For manufacturing laminated glazing with good penetration resistance, for example for automotive applications, like windscreens according to ECE R43 or in buildings according to EN 356, it is known to laminate two glass sheets with plasticized polyvinyl butyral having reduced adhesion to glass. The reduced adhesion ensures energy uptake by the interlayer in case of a mechanical impact by stretching rather than breaking. On the other hand, adhesion should be high enough to prevent delamination of glass splinters from the interlayer. Both effects can be summarized by the property "penetration resistance".

The adhesion of plasticized polyvinyl butyral films (PVB films) is usually adjusted by adding small amounts of adhesion control agents like metal salts, especially alkali or alkaline earth metal salts, to the bulk of the film. During lamination to the glass, such metal ions interact with the glass surface, resulting in a reduced adhesion of the PVB-film to the glass surface. The amount of adhesion control agent depends on the composition of the PVB film and the surface chemistry of the glass sheets. Of course, adhesion control is necessary for all interfaces between glass and film surfaces, since the penetration resistance is limited by the interface with highest adhesion. Thus, a laminated glass with one interface of low adhesion and a second interlace of high adhesion will rather exhibit the poor impact performance of a laminated glass with too high adhesion on both interfaces.

Recently, thin PVB-films having a low or no plasticizer content have been proposed as "functionality carriers" in conjunction with thick PVB-films having the usual content of plasticizer and adhesion control agent for the production of functionalized laminated glazing.

In such laminates, the thin PVB-films can be in contact with the glass surface, it was found, that although metal salts are thought to migrate from the plasticized, thick PVB-films to the thin PVB-films, the resulting adhesion of the interlayer film to the glass was too high to achieve good penetration resistance.

Furthermore, it was found that simply adding the same amount and type of adhesion control agent commonly used in thick, plasticized PVB film in contact with glass does not reduce adhesion of low plasticized PVB films as necessary by, for example, the impact requirements as stipulated by ECE R43.

Usually, plasticized PVB film in contact with glass are additionally supplied with magnesium salts as adhesion control agents in order to reduce differences in surface chemistry of the glass sheets. Surprisingly, it was found that magnesium salts have a very limited effect on adhesion of low plasticized PVB-films to glass as compared to plasticized PVB-film.

SUMMARY OF THE INVENTION

An object of the present invention was therefore to provide layers for laminated glazing with a reduced plasticizer content which give the final laminated glass good penetration properties. These and other objects are surprisingly obtained by the discovery that a certain amount of alkali metal ions in the thin, low plasticizer film provides sufficient reduction of adhesion to the glass surface.

The invention therefore relates to laminated glass obtained by laminating at least one film A containing a polyvinyl acetal PA and optionally at least one plasticiser WA, and at least one film B containing a polyvinyl acetal PB and at least one plasticiser WB, between two glass sheets, wherein prior to lamination
the amount of plasticiser WA in film A is less than 16% by weight
the amount of plasticiser WB in film B is at least 16% by weight and
film A comprises at least 7 ppm alkali metal ions.

DETAILED DESCRIPTION OF THE PREFERRED EMBODIMENT(S)

Hereinafter, the term "prior to lamination" is understood to mean the state of the films A and B prior to having any contact with each other. For example, the term refers to the composition of each film separately formed and separately wound on individual rolls. The term "prior to lamination" refers to the state of the layers or films before combining them either in the lamination process of the laminated glass or prior to building a stack from the layers used for lamination.

As alkali metal ions, potassium or sodium or lithium are preferred. Preferred ranges of concentration of the alkali metal ions are 7-210, preferably 14-140 and more preferably 21-140 ppm in the case of lithium, 23-690, preferably 46-460 and more preferably 69-460 ppm in the case of sodium and 39-1170, preferably 78-780 ppm and more preferably 117-780 in the case of potassium. It is furthermore preferred to add the alkali metal ions in form of salts of carboxylic acids having 1 to 10 carbon atoms. Especially preferred is potassium acetate as an adhesion control agent.

The total amount of alkali metal salts may be as low as 0.005% by weight based on the weight of film A. Preferred ranges of alkali metal salt are 0.01%-0.1%; 0.02-0.08%; 0.03-0.06%, each weight % based on the weight of film A.

Film A used in the laminates of the invention may additionally comprise alkaline earth metal ions, but since their erect on adhesion is limited, only small amounts as compared to the alkali metal ions should be used. In a first embodiment of the invention film A comprises 0 to 20 ppm alkaline earth metal ions, preferable 0 to 5 ppm.

However, it is known that alkaline earth metal ions have a balancing effect of adhesion when a plasticized PVB film faces two glass sheets with different surface chemistry.

Accordingly, in a second embodiment of the invention, film A comprises 5-20 ppm alkaline earth metal ions. The alkaline earth metal ions can be added in the form of salts of carboxylic acids having 1 to 10 carbon atoms. Especially preferred is magnesium acetate as secondary adhesion control agent. In this embodiment, the ratio of alkali metal ions to alkaline earth metal ions in ppm in film A is preferably at least 1, especially higher than 5 and more preferrably higher than 10.

In addition, the alkaline titer of film A may be higher than 10, higher than 20, higher than 40, higher than 50, higher than 80, higher than 90 and preferably higher than 100, in each case with a maximum value of 500. In contrast to film A, the alkaline titer of film B is preferred to be lower, and more particularly, the difference between alkaline titer (film A)–alkaline titer (film B) is more than 2, more preferably more than 6 and most preferably more than 10 AT units.

In order to avoid haze, the amount of chloride ions and/or nitrate ions and/or sulphate ions in film A may be reduced. The chloride content of the film A can thus be less than 150 ppm, preferably less than 100 ppm, and in particular less than 50 ppm. In the ideal case, the chloride content of the film A is less than 10 ppm or even 0 ppm.

The nitrate content of film A optionally may be less than 150 ppm, preferably less than 100 ppm, and in particular less than 50 ppm. In the ideal case, the nitrate content of film A is less than 10 ppm or even 0 ppm.

Again optionally, the sulphate content of film A may be less than 150 ppm, preferably less than 100 ppm, and in particular less than 50 ppm. In the ideal case, the sulphate content of the film A is less than 10 ppm or even 0 ppm.

The adhesion of the interlayer film to the glass sheet can be assessed by measuring the compressive shear strength of a test laminate according to DE 197 56 274 A1. In this test, the compressive shear strength is determined for a laminate build from 2 mm float glass/film A with alkali metal ion/0.76 mm film B of Mowital B75H (product of Kuraray Europe GmbH) comprising 27.5% 3G8/DBEA (10:1 mix by weight) as the plasticizer, free of adhesion reducing additives/film A with alkali metal ion/2 mm float glass, after one week conditioning the test laminate at 23° C.

In another variant of the invention, the laminated glass may have a compressive shear strength according to DE 197 56 274 A1 between 22 N/mm$^2$ and 4 N/mm$^2$, preferably, in order of increasing preference, between 20 N/mm$^2$ and 4 N/mm$^2$, between 18 N/mm$^2$ and 5 N/mm$^2$, between 16 N/mm$^2$ and 6 N/mm$^2$, between 15 N/mm$^2$ and 7 N/mm$^2$, between 14 N/mm$^2$ and 7 N/mm$^2$, between 13 N/mm$^2$ and 7 N/mm$^2$, and most preferrably between 12 N/mm$^2$ and 8 N/mm$^2$.

The films A and B may contain, in the starting state prior to lamination and/or in a stack prepared for lamination between glass sheets, a single plasticiser as well as mixtures of plasticisers both of different and identical compositions. The term "different composition" refers to both the type of plasticiser and proportion thereof in the mixture. Film A and film B after lamination, i.e. in the finished laminated glass, preferably have the same plasticisers WA and WB. In a preferred variant, film A in its starting state, however, does not contain any plasticiser and after lamination contains plasticiser WB in an equilibrium amount.

Plasticiser-containing films B used in accordance with the invention contain, in the starting state prior to lamination, at least 16% by weight, preferably 16.1-36.0% by weight, more preferably 22.0-32.0% by weight, and in particular 26.0-30.0% by weight plasticiser.

Films A used in accordance with the invention may contain, in the starting state prior to lamination, less than 16% by weight (such as 15.9% by weight), less than 12% by weight, less than 8% by weight, less than 6% by weight, less than 4% by weight, less than 2% by weight, less than 1% by weight or even no plasticiser (0.0% by weight). In a preferred embodiment of the invention, films A with a low plasticiser content preferably contain 0.0-8% by weight plasticiser.

In the method according to the invention, the film A in the starting state prior to lamination has a thickness of no more than 20%, preferably 15%, and preferably no more than 10% of the thickness of the film or films B.

The thickness of a film A in the starting state prior to lamination is 10-250 μm, preferably 20-160 μm, more preferably 30-120 μm, yet more preferably 40-100 μm, and most preferably 50-80 μm. These ranges of thickness not include additional coatings on the films. In the laminated glass, the thickness of the film can increase by transfer of plasticiser from film B.

Film A is produced separately from film B (for example extruded or solvent cast) and has either no plasticiser at all or sufficiently small proportion of plasticiser so that subsequent functionalization and processing is not adversely influenced.

The thickness of a film B in the starting state is 450-2500 μm, preferably 600-1000 μm, and more preferably 700-900 μm. A plurality of films B may be used in the invention, either being stacked on each other or separated by films A.

If films B are stretched prior to production of the sandwich and/or additionally are adapted to the shape of a screen (for example a windscreen) in a curved manner, the specified thicknesses at the moment of lamination may reduce once more by up to 20%.

At least one thin film A is oriented towards a glass surface of the laminated glass according to the invention. It is also possible to apply a film A to both glass surfaces, such that a laminated glass laminate with a layer sequence glass/film A/film B/film A/glass is provided.

In the case of automotive glazing, it is not preferable for aesthetic and stability reasons to seal the edges of the laminated glass laminates with sealants. This promotes the susceptibility of such glazing to the formation of edge defects, such as detachments of the layers from one another or delamination of the layers from the glass surface.

In the method according to the invention, the film A having a low plasticiser content can be tailor cut and positioned such that it does not reach everywhere in the laminated glass laminate as far as the edge of the laminate. In particular, the film A can be smaller in the edge region by at least 1 mm compared with at least one glass sheet, such that the film B in this edge region is in direct contact with the glass sheet elsewhere adjacent to and contacting film A.

Furthermore, the thin film A, which has a low plasticiser content or even no plasticiser content in the starting state, can be perforated prior to the insertion into the glass/film sandwich, such that it can have openings, like passages, holes or slits, in any geometric pattern.

The film A can thus have at least one opening, such that by means of this opening the film B is in direct contact with at least one glass surface. Following adhesive, bonding to form the finished laminated glass, the film B with higher plasticiser content in the starting state is adhesively bonded at these points to the glass sheets without interruption. In particular, openings can thus be obtained at points of the laminated glass behind which the function of sensor elements, optics elements and/or antenna elements would otherwise be hindered by a heat-shielding or pigmented layer applied to or carried by film A.

The thickness of film A may be utilized to compensate for the thickness of another film which is not provided on the complete surface of film B. In this case, optical distortion may result from the difference in thickness of the interlayer film. Films A of the invention can equalize the thickness of the additional film, for example by using a frame or an opening of film A to surround the additional film layer, i.e. the additional film layer is provided to the opening of film A. In this case, the thickness of film A may differ less than 50% of the thickness of the additional film layer, preferably less than 30% of the thickness and even more preferably less than 15% of the thickness. At best, film A has substantially the same thickness as the additional film. It is possible to combine several films A to achieve the required total thickness. The additional film may be equipped for example with a IR reflective coating, light-reflective or guiding structures like a semitransparent mirror or holographic layer or electrically conductive structures and/or provide additional penetration resistance like PET films.

Functionalized Films

Films A may be provided with a functionality such as heat-shielding particles, heat-shielding coatings, a reduced transmission of light, colour and/or electrically conductive structures, such as heating wires and antennas as disclosed in PCT/EP2014/075860.

When using more than one film A, they may each be provided with the same different functionality.

In a preferred embodiment of the invention, films A are provided as heat-shielding film as disclosed in PCT/EP2014/075853. Heat-shielding films are considered to be films which, with comparative measurement and evaluation according to ISO 13837:2008 (v=14 m/s; value in %) in a test laminate consisting of 2×2.1 mm clear glass (for example Planilux™ glass (St. Gobain) and, intermediately arranged as film B, a standard automotive film (for example TROSIFOL® VG R100.76) as well as a film A without heat-shielding function and an accordingly structured laminate, in which film A has the heat-shielding function, have a reduced total solar transmittance (TTS) as follows:

TTS (film A without heat shielding function)−TTS (film A with heat shielding function)>10%,>12.5%,>15%,>17.5% or >20%.

In addition, the furnishing according to the invention of film A with a heat-shielding function, upon comparison and contrasting of the described test laminates, can have the advantage that the light transmission (TL measured in accordance with EN 410; 2011, value in %) is reduced to a smaller extent by introduction of the heat-shielding function, similarly to the total solar transmittance TTS (according to ISO 13837:2008, v=14 m/s; value in %).

Heat-shielding films A used in accordance with the invention preferably have quotients of TL/TTS of more than 1.2 or of more than 1.25 or of more than 1.30 or of more than 1.35 or of more than 1.40 or of more than 1.45.

The heat-shielding films A can contain, as heat-shielding particles or as heat-shielding coatings, for example ITO, ATO, AZO, IZO, zinc antimonates, tin-doped zinc oxide, silicon-doped zinc oxide, gallium-doped zinc oxide, tungstanates such as $LiWO_3$, $NaWO_3$, $CsWO_3$, lanthanum hexaboride or cerium hexaboride.

The heat-shielding particles preferably have a mean diameter from 5 to 500 nm. The proportion of heat-shielding particles in the films A may be 1-20% by weight, preferably 2-10% by weight. Alternatively or in addition to heat-shielding particles, heat-shielding coatings based on metal layers or stacks of dielectric layers may be used on a surface of film A.

In order to avoid corrosion at the heat-shielding particles or heat-shielding coating, the amount of chloride ions and/or nitrate ions and/or sulphate ions can be reduced as already disclosed.

Polyvinyl Acetal

The films A and B used in accordance with the invention contain polyvinyl acetals, which are produced by acetalisation of polyvinyl alcohol or ethylene vinyl alcohol copolymer.

The films can contain polyvinyl acetals having a different polyvinyl alcohol content, degree of acetalisation, residual acetate content, ethylene proportion, molecular weight and/or different chain lengths of the aldehyde of the acetal groups.

In particular, the aldehydes or keto compounds used for the production of the polyvinyl acetals can be linear or branched (that is to say of the "n" or "iso" type) containing 2 to 10 carbon atoms, which leads to corresponding linear or branched acetal groups. The polyvinyl acetals are referred to accordingly as "polyvinyl (iso)acetals" or "polyvinyl (n)acetals".

The polyvinylacetal used in accordance with the invention results in particular from the reaction of at least one polyvinyl alcohol with one or more aliphatic unbranched ketocompounds containing 2 to 10 carbon atoms. To this end, n-butyraldehyde is preferably used.

The polyvinyl alcohols or ethylene vinyl alcohol copolymers used to produce the polyvinyl acetals in the films A or B may be identical or different, pure or a mixture of polyvinyl alcohols or ethylene vinyl alcohol copolymers with different degree of polymerisation or degree of hydrolysis.

The polyvinyl acetate content of the polyvinyl acetals in the films A or B can be set by use of a polyvinyl alcohol or ethylene vinyl alcohol copolymer saponified to an appropriate degree. The polarity of the polyvinyl acetal is influenced by the polyvinyl acetate content, whereby the plasticiser compatibility and the mechanical strength of the respective layer also change. It is also possible to carry out the acetalisation of the polyvinyl alcohols or ethylene vinyl alcohol copolymers with a mixture of a number of aldehydes or keto compounds.

The films A or B preferably contain polyvinyl acetals having a proportion of polyvinyl acetate groups based on the layers, either identically or differently, of 0.1 to 20 mol %, preferably 0.5 to 3 mol %, and more preferably 5 to 8 mol %.

The polyvinyl alcohol content of the polyvinyl acetal PA used in film A may be between 6-26% by weight, and in order of increasing preference 8-24% by weight, 10-22% by weight, 12-21% by weight, 14-20% by weight, 16-19% by weight and more preferably between 16 and 21% by weight or 10-16% by weight.

Independently of film A, the polyvinyl alcohol content of the polyvinyl acetals PB used in film B may be between 14-26% by weight, 16-24% by weight, 17-23% by weight and preferably between 18 and 21% by weight.

In a preferred embodiment of the invention, film A comprises a polyvinyl acetal PA with a proportion of vinyl alcohol groups from 6 to 26% by weight and the film B comprises a polyvinyl acetal B with a proportion of vinyl alcohol groups from 14 to 26% by weight.

The films A or B preferably contain uncrosslinked polyvinyl acetal. The use of crosslinked polyvinyl acetals is also possible. Methods for crosslinking polyvinyl acetals are described, for example, in EP 1527107 B1 and WO 2004/063231 A1 (thermal self-cross-linking of polyvinyl acetals containing carboxyl groups), EP 1606325 A1 (polyvinyl acetals crosslinked with polyaldehydes) and WO 03/020776 A1 (polyvinyl acetal crosslinked with glyoxylic acid).

Plasticizer

Films A and/or B used in accordance with the invention may contain, as plasticizer(s), one or more compounds selected from the following groups:

esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate.

esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate phosphates with aliphatic or aromatic ester alcohols, such as tris(2-ethylhexyl)phosphate (TOF), triethyl phosphate, diphenyl-2-ethylhexyl phosphate, and/or tricresyl phosphate esters of citric acid, succinic acid and/or fumaric acid.

By definition, plasticizers are organic liquids having a high boiling point. For this reason, further types of organic liquids having a boiling point above 120° C. can also be used as plasticiser.

Films A in the variants in which a plasticiser WA is present in film A in the starting state, and also films B particularly preferably contain 1,2-cyclohexane dicarboxylic acid diisononyl ester (DINCH) or triethylene glycol-bis-2-ethyl hexanoate (3GO or 3G8) as plasticisers.

Film B may consist of two or more sub-films B' and B", which have a different plasticiser content.

In addition, films A and B may contain further additives, such as residual quantities of water, UV absorbers, antioxidants, adhesion regulators, optical brighteners or fluorescent additives, stabilisers, colorants, processing aids, inorganic or organic nanoparticles, pyrogenic silicic acid and/or surface active substances.

In particular, film B may comprise 0.001 to 0.1% by weight of alkaline metal salts and/or alkaline earth salts of carboxylic acids as an adhesion control agent. It is preferred that film B contains magnesium ions in an amount of at least 10 ppm, preferably 20 ppm and most preferably 30 ppm.

Lamination Process

The present invention also relates to a method for producing the described penetration resistant glass laminates, in which the film A is positioned on a glass sheet, then covered by at least one film B, and a second glass sheet is then applied.

Alternatively, it is possible for film B to be positioned on a glass sheet, then to be covered by at least one film A, and for a second glass sheet to be applied.

The present invention relates furthermore to a method for producing a laminated glass wherein a stack comprising at least one film A and at least one film B is provided, the stack is positioned on a first glass sheet and a second glass sheet is then applied.

It is possible in accordance with the invention to first melt the film A onto a glass sheet over the entire area or locally by increased temperature and to then cover this with the film B. Alternatively, films A and B can be positioned jointly between two glass sheets and melted at increased temperature.

The lamination step for producing a laminated glass is preferably carried out such that films A and B are positioned between two glass sheets and the layered body thus prepared is pressed under increased or reduced pressure and increased temperature to form a laminate.

To laminate the layered body, the methods with which a person skilled in the art is familiar can be used with and without prior production of a pre-laminate.

What are known as autoclave processes are carried out at an increased pressure from approximately 10 to 15 bar and temperatures from 100 to 150° C. during approximately 2 hours. Vacuum bag or vacuum ring methods, for example according to EP 1 235 683 B1, function at approximately 200 mbar and 130 to 145° C.

What are known as vacuum laminators can also be used. These consist of a chamber that can be heated and evacuated, in which laminated glazings can be laminated within 30-60 minutes. Reduced pressures from 0.01 to 300 mbar and temperatures from 100 to 200° C., in particular 130-160° C., have proven their worth in practice.

In the simplest case, in order to produce the laminated glass laminates, film A or B is positioned on a glass sheet, and the further film B or A is positioned synchronously or subsequently. The second glass sheet is then applied and a glass film laminate is produced. Excessive air can then be removed with the aid of any pre-lamination method known to a person skilled in the art. Here, the layers are also already firstly lightly adhesively bonded to one another and to the glass.

The glass film laminate may then be subjected to an autoclave process. Film A is preferably positioned on the first glass sheet and covered by the thicker film B before the second glass sheet is applied. The method can be carried out in many conceivable and, in principle, practicable variants. For example, film A is easily removed from a roll of an appropriate width, whereas film B has been tailor-cut beforehand to the size of the laminated glass to be produced. This is advantageous in particular in the case of windscreens and other automotive glazing parts. In this case, it is particularly advantageous to additionally still stretch the thicker film B before it is tailor cut. This enables a more economical use of film, or, for the case in which film B has a colour tint, allows the adaptation of the curvature thereof to the upper sheet edge.

In the automotive field, in particular for the production of windscreens, films A and/or B may be provided with a coloured region like an ink ribbon in the upper region of the films. To this end, either the upper part of films A and B can be co-extruded with a suitably coloured polymer melt, or there may be a different colouration in some areas in a multi-layer system of one of the films A and B. In the present invention, this can be achieved by complete or partial colouring of at least one of the films A and B.

In accordance with the invention, films B may therefore have a colour tint, which in particular has already been adapted in a prior process step to the geometry of a windscreen.

It is also possible for the films B to have a wedge-shaped thickness profile. The laminated glass laminate according to the invention obtains a wedge-shaped thickness profile even with plane-parallel thickness profile of the film A and can be used in motor vehicle windscreens for HUD displays.

In the simplest case, film B is a commercially available PVB film with or without ink ribbon and with or without a wedge-like thickness profile. Films B with nanoparticles dispersed therein for IR protection can also be used as coloured films. Of course, a film B may also be a film having an acoustic function, such that soundproofing properties that are further improved are obtained by combination with a film A. Of course, a film B may already also combine a number of the mentioned functions.

The thin films A are generally produced by extrusion with use of a cast-film line or in the form of a blown film. Here, a surface roughness may also be produced by controlled melt fracture or with the cast-film method additionally by use of a structured chill roll and/or structured back roll. Alternatively, a solvent-cast method can be used for producing film A prior to functionalization and use in the described penetration resistant glass laminates. Films used in accordance with the invention preferably have a one-sided surface structure with a roughness Rz from 0 to 25 µm, more preferably an Rz from 1 to 20 µm, yet more preferably an Rz from 3 to 15 µm and in particular an Rz from 4 to 12 µm. It is particularly preferable if the side of film A coming into contact with the glass sheet has a surface roughness Rz of no more than 20% of its thickness.

If the surface of film A is provided with a heat-shielding coating, a particularly low surface roughness prior to application of the coating is preferred. In particular, the roughness parameter Ra here is less than 3 µm and Rz is less than 5 µm.

EXAMPLES

PVB resin powder (commercial grade Mowital B60H of Kuraray Europe GmbH) was fed to the inlet funnel of a lab-extruder of the co-rotating twin screw type. Either no adhesion controller or aqueous solutions of the given alkali metal and or alkaline earth metal salts were simultaneously dosed into the extruder inlet zone. The melt was extruded from a 34 cm wide slit die onto a cooled chill roll to form and subsequently wind thin plasticizer free films in a width of 30 cm with a thickness between 120 and 130 µm (employed and evaluated as turn A)

Prior to analytical determination of moisture content (Karl-Fischer-Method) and metal content (Ion-Chromatography) the rolls were stored in a conditioned area having a constant climate of 23° C./28% RH.

Commercial automotive grade PVB film with reduced adhesion (TROSIFOL® VG R10 0.76 from Kuraray Europe GmbH=example of film B) and commercial high adhesion architectural grade PVB film (TROSIFOL® BG R20 0.76 from Kuraray Europe GmbH) were conditioned at the same climate prior to producing the test laminates.

Test laminates in the dimension 30×30 cm were obtained by combining clear glass (Planilux® 2.1 mm, cleaned with deionized water <5 µS on a flat glass washing machine) with the film A and B in the following lay-up orders:

For adhesion test and penetration resistance in combination with automotive grade PVB: bottom glass (air side)–film A–VG R10–(tin side) top glass For compressive shear characterization in combination with high adhesion grade PVB: bottom glass (air side)–film A–BG R20–film A–(air side) top glass The different sandwiches were passed through a commercial flat glass laminating nipper-line to produce pre-laminates. Lamination was accomplished by using an autoclave with standard conditions (90 min. comprising 30 min. hold time at 140° C. and 12 bar).

Prior to further mechanical evaluation, laminates were allowed to sit for 1 week at 23° C. ambient conditions.

Penetrations resistance of the laminate structures was tested according ECE 43R.

The alkaline titer is measured as follows: 3-4 g of the polyvinyl acetal film are dissolved in 100 ml mixture of ethyl alcohol/THF (80:20) on a magnetic stirrer overnight. 10 ml of diluted hydrochloric acid (c=0.01 mol/l) are added. Excess hydrochloric acid is potentiometrically titrated with a solution of tetrabutylammonium hydroxide in 2-propanol (TBAH, c=0.01 mol/l) using a titroprocessor (e.g. by Metrohm) against a blank sample. Alkaline titer is calculated as:

ml (0.01 mol/l HCl) per 100 g of sample=(ml TBAHblank−ml TBAHsample)×100/sample weight in g.

The adhesiveness of the film to glass is given by 'pummel values', in each case based on the air or tin side of the glass. The pummel test is carried out in a manner known to the person skilled in the art.

As can be seen from table 1, laminates according to the invention have a high penetration resistance and pass the impact test according ECE 43, as compared to the comparison examples in table 2 which all fail this test.

TABLE 1

| Film A | Example 1 | Example 2 | Example 3 | Example 4 | Example 5 | Example 6 |
|---|---|---|---|---|---|---|
| adhesion control agent | KAc | KAc | KAc/MgAc2 | KAc/MgAc2 | KC8 | KC8 |
| parts PVB resin (Mowital B60H) | 100 | 100 | 100 | 100 | 100 | 100 |
| % deionized water for dosage of adhesion controller salt. Weight-% relative to PVB | 0.25 | 0.5 | 0.55 | 0.525 | — | — |
| MAGNESIUM-2-ETHYLHEXANOATE (25%) solution in water | — | — | — | — | — | — |
| POTASSIUM-2-ETHYLHEXANOATE (25%) in water | — | — | — | — | 0.223 | 0.446 |
| potassium acetate | 0.025 | 0.05 | 0.02 | 0.035 | — | — |
| MAGNESIUM-ACETATE TETRAHYDRATE | — | — | 0.035 | 0.0175 | — | — |
| film analysis (after 48 h conditioning at 23° C./28% RH) | | | | | | |
| moisture content of film A by Karl-Fischer-Method [%] prior to lamination | 0.9 | 0.92 | 0.9 | 0.92 | 0.9 | 0.92 |
| thickness of film A in mm prior lamination | 0.12 | 0.12 | 0.12 | 0.12 | 0.12 | 0.12 |
| ppm potassium by IC | 94 | 193 | 78 | 136 | 118 | 226 |

TABLE 1-continued

| Film A | Example 1 | Example 2 | Example 3 | Example 4 | Example 5 | Example 6 |
|---|---|---|---|---|---|---|
| ppm Mg by IC | 0.6 | 1 | 40 | 18 | 0.6 | 0.5 |
| ppm ratio K/Mg | >100 | >100 | 1.95 | 7.55 | >100 | >100 |
| alkaline titer of film A | 59 | 97 | 109 | 105 | 74 | 115 |
| co-lamination with VG R10 (film B) | laminates of 1 × film A with VG R10 0.76 between 2 × 2.1 mm clear glass in air/tin orientation. Air side facing film A | | | | | |
| laminate moisture | 0.43 | 0.42 | 0.44 | 0.46 | 0.45 | 0.44 |
| Pummel value film A on air side | 5 | 2.5 | 4 | 2 | 5 | 1 |
| Pummel value film B (VG R10) on tin side | 3 | 2.5 | 2 | 2.5 | 3 | 2.5 |
| compressive shear strength in N/mm2 | 13.0 | 12.7 | 13.4 | 11.0 | 13.7 | 9.6 |
| pass/fail in ball drop test ECE 43 2.26 kg from 4 m drop height | pass | pass | pass | pass | pass | pass |
| co-lamination with BG R20 0.76 (film B) | laminates of 2 × film A with BG R20 0.76 between 2 × 2.1 mm clear glass in air/air orientation. Air sides facing film A | | | | | |
| compressive shear strength in N/mm2 | 16.7 | 11.0 | 15.2 | 9.8 | 10.5 | 9.2 |

| Film A | Example 1 | Example 2 | Example 3 | Example 4 | Example 5 | Example 6 |
|---|---|---|---|---|---|---|
| Pummel value film A on air side | 5 | 2.5 | 4 | 2 | 5 | 1 |
| Pummel value film B (VG R10) on tin side | 3 | 2.5 | 2 | 2.5 | 3 | 2.5 |
| compressive shear strength in N/mm2 | 13.0 | 12.7 | 13.4 | 11.0 | 13.7 | 9.6 |
| pass/fail in ball drop test ECE 43 2.26 kg from 4m drop height | pass | pass | pass | pass | pass | pass |
| co-lamination with BG R20 0.76 (film B) | laminates of 2× film A with BG R20 0.76 between 2 × 2.1 mm clear glass in air/air orientation. Air sides facing film A | | | | | |
| compressive shear strength in N/mm2 | 16.7 | 11.0 | 15.2 | 9.8 | 10.5 | 9.2 |

TABLE 2

| Film A | Comp. Example 1 | Comp. Example 2 | Comp. Example 3 | Comp. Example 4 | Comp. Example 5 |
|---|---|---|---|---|---|
| adhesion control agent | no AC | MgAc2 | MgAc2 | MgC8 | MgC8 |
| parts PVB resin (Mowital B60H) | 100 | 100 | 100 | 100 | 100 |
| % deionized water for dosage of adhesion controller salt, Weight-% relative to PVB | — | 0.5 | 0.25 | — | — |
| MAGNESIUM-2-ETHYLHEXANOATE (25%) solution in water | — | — | — | 0.24 | 0.12 |
| POTASSIUM-2-ETHYLHEXANOATE (25%) in water | — | — | — | — | — |
| potassium acetate | — | — | — | — | — |
| MAGNESIUM-ACETATE TETRAHYDRATE | — | 0.035 | 0.0175 | — | — |
| film analysis (after 48 h conditioning at 23° C./28% RH) | | | | | |
| moisture content of film A by Karl-Fischer-Method [%] prior to lamination | 1.02 | 1.03 | 0.98 | 0.97 | 0.99 |
| thickness of film A in mm prior lamination | 0.12 | 0.12 | 0.13 | 0.13 | 0.13 |
| ppm potassium by IC | <1 | <1 | <1 | <1 | <1 |
| ppm Mg by IC | 0.5 | 42 | 20 | 47 | 22 |
| ppm ratio K/Mg | — | <0.1 | <0.1 | <0.1 | <0.1 |
| alkaline titer of film A | 21 | 82 | 50 | 56 | 39 |
| co-laminaiion with VG R10 (film B) | laminates of 1 × film A with VG R10 0.76 between 2 × 2.1 mm clear glass in air/tin orientation. Air side facing film A | | | | |
| laminate moisture | 0.45 | 0.45 | 0.43 | 0.45 | 0.43 |
| Pummel value film A on air side | 8 | 8 | 7 | 7 | 8 |
| Pummel value film B (VG R10) on tin side | 1.5 | 2 | 1.5 | 2 | 2 |
| compressive shear strength in N/mm2 | 11.0 | 12.0 | 13.5 | 12.4 | 14.0 |
| pass/fail in ball drop test ECE 43 2.26 kg from 4 m drop height | fail | fail | fail | fail | fail |
| co-laminaiion with BG R20 0.76 (film B) | laminates of 2 × film A with BG R20 0.76 between 2 × 2.1 mm clear glass in air/air orientation. Air sides facing film A | | | | |
| compressive shear strength in N/mm2 | 26.1 | 22.8 | 25.6 | 24.2 | 23.9 |

What is claimed is:

1. A laminated glass obtained by laminating at least one film A containing a polyvinyl acetal PA and optionally at least one plasticiser WA and at least one film B containing a polyvinyl acetal PB and at least one plasticiser WB, between two glass sheets, wherein the at least one film A directly contacts a glass surface of the laminated glass and wherein the at least the film A is provided with a functionality selected from the group consisting of heat-shielding particles, heat-shielding coatings, reduced light transmission, colour, and electrically conductive structures and wherein prior to lamination, film A comprises no plasticiser, the amount of plasticiser WB in film B is from 22.0 to 30.0% by weight, and film A comprises at least 7 ppm alkali metal ions.

2. The laminated glass according to claim 1, wherein film A further comprises 0-20 ppm alkaline earth metal ions.

3. The laminated glass of claim 1, wherein alkaline earth metal ions are present, and the ratio of alkali metal ions to alkaline earth metal ions in ppm in film A is at least 1.

4. The laminated glass of claim 1, wherein film A has an alkaline titer higher than 10.

5. The laminated glass of claim 1, wherein the film A comprises a polyvinyl acetal PA with a proportion of vinyl alcohol groups of from 6 to 26% by weight and the film B comprises a polyvinyl acetal PB with a proportion of vinyl alcohol groups from 14 to 26% by weight.

6. The laminated glass of claim 1, wherein the film B comprises 0.001 to 0.1% by weight alkali metal salts of carboxylic acid(s) and/or alkaline earth metal salts of carboxylic acid(s).

7. The laminated glass of claim 1, wherein the film A has a smaller surface area than film B.

8. The laminated glass of claim 1, wherein the film A has at least one opening, such that by means of this at least one opening the film B is in direct contact through said at least one opening with the glass sheet to which other portions of film A containing no opening are laminated.

9. The laminated glass of claim 1, wherein the film A has at least one opening, to which an additional film layer is provided wherein the thickness of film A differs by less than 50% of the thickness of the additional film layer.

10. The laminated glass of claim 1, wherein the film B consists of at least two sub-films B' and B", which have different plasticiser contents.

11. The laminated glass of claim 1, wherein the film B has a wedge-shaped thickness profile.

12. The laminated glass of claim 1, wherein the film B has a coloured region.

13. The laminated glass of claim 1, wherein film A has a coloured region.

14. The laminated glass of claim 1, wherein the film A has a thickness of 1-150 μm.

15. The laminated glass of claim 1, wherein heating wires are present in film A.

16. The laminated glass of claim 1, wherein an antenna is present in film A.

17. A method for producing a laminated glass of claim 1, wherein the film A is positioned on a first glass sheet, is then covered by at least one film B, and a second glass sheet is then applied.

18. A method for producing a laminated glass of claim 1, wherein a stack comprising at least one film A and at least one film B is provided, the stack is positioned on a first glass sheet and a second glass sheet is then applied.

* * * * *